W. H. DONCASTER.
DINNER PAIL.
APPLICATION FILED JAN. 31, 1917.
1,229,912.
Patented June 12, 1917.
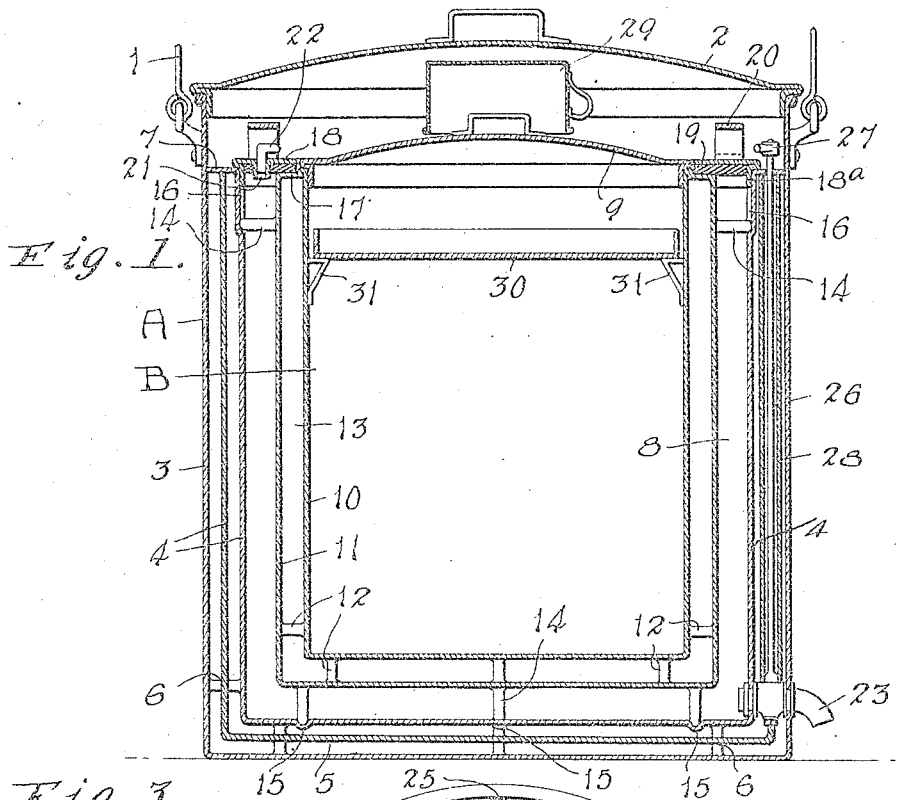
Inventor
W. H. DONCASTER
By H. S. Kie
Attorney

UNITED STATES PATENT OFFICE.

WILLIAM H. DONCASTER, OF BROWNINGTON, VERMONT.

DINNER-PAIL.

1,229,912. Specification of Letters Patent. Patented June 12, 1917.

Application filed January 31, 1917. Serial No. 145,686.

*To all whom it may concern:*

Be it known that I, WILLIAM H. DONCASTER, a citizen of the United States, residing at Brownington, in the county of Orleans, State of Vermont, have invented a new and useful Dinner-Pail; and I do hereby declare the following to be a full, clear, and exact description of the invention, such as will enable others skilled in the art to which it appertains to make and use the same.

The present invention relates to a dinner pail, and has for its object to provide a device of this character which embodies novel features of construction whereby provision is made for carrying some form of liquid or beverage and maintaining it in either a hot or a cold condition for a considerable length of time.

Further objects of the invention are to provide a dinner pail which is comparatively simple and inexpensive in its construction, which can be taken apart and thoroughly cleansed so that the liquid receiving chamber will never become sour, which can be conveniently carried from place to place, and which confines the liquid or beverage in such a manner that it does not occupy an unreasonable amount of space and does not interfere with the other portions of the lunch.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a vertical sectional view through a dinner pail constructed in accordance with the invention.

Fig. 2 is a top plan view of the same with the outer cover removed.

Fig. 3 is a detail view of one of the locking wings for the annular closure of the liquid receiving chamber.

Corresponding and like parts are referred to in the following description and indicated in all the views of the drawings by the same reference characters.

Specifically describing the present embodiment of the invention, the reference character A designates an outer shell which is provided with a conventional handle 1 for convenience in carrying, and which is adapted to be closed at the top by a removable flanged cover 2. This outer shell A may be of any desired shape or configuration, although in the present instance it is shown as being cylindrical in form. The sides and bottom of the shell have a triple walled formation, including an outer wall 3 and two spaced inner walls 4 which coöperate with each other and the outer wall to provide two vacuum spaces 5. Suitable brace members 6 are provided between the outer and inner walls 3 and 4, and at the sides of the shell the inner walls 4 terminate a short distance below the top thereof, thereby providing an upwardly facing interior shoulder 7.

Arranged removably within the outer shell A is a food compartment B which is correspondingly shaped, but smaller in diameter and shorter in length, so that a liquid receiving space 8 is provided between the food compartment and the outer shell. The top of the food compartment B is designed to be closed by a removable flanged cover 9, and the sides and bottom thereof have a double walled construction, being formed with an inner wall 10 and a spaced outer wall 11 which are connected at suitable intervals by braces 12, and coöperate with each other to provide a vacuum space 13. Spacing arms 14 project from the bottom and sides of the food compartment B and are designed to engage the inner walls 4 of the outer shell A to hold the food compartment in a properly spaced relation thereto and accurately define the liquid receiving chamber 8 which surrounds the sides and bottom of the food compartment. If desired, the bottom and outer shell A may be provided with positioning depressions 15 to receive the extremities of the spacing arms 14 on the bottom of the food compartment and coöperate therewith to prevent any possibility of the food compartment becoming loose within the outer chamber and rattling or jarring about therein when the dinner pail is being carried. In order to insure a seating of the arms 14 within the positioning depressions 15, the inner side walls 4 of the outer shell may have short vertical grooves 16 pressed therefrom to receive the extremities of the side spacing arms 14. With such a construction the food compartment must be brought into proper position for seating the lower spacing arms 14 in the depressions 15 before it can be lowered the full amount in the shell.

An upwardly facing shoulder 17 is provided at the top of the food compartment B, said shoulder being at substantially the same elevation as the shoulder 7 and the outer shell when the parts are assembled.

An annular closure 18 is provided for the upper end of the liquid receiving chamber 8, said closure being flanged at the outer side thereof, as indicated at 18ᵃ for engagement with the outer shell A, while the inner edge thereof projects over the shoulder 17 of the food compartment B. A suitable packing ring 19 of cork or rubber may be applied to the lower face of the closure 18 for engagement with the shoulder 17 of the food compartment to provide a tight joint therewith and prevent leakage of the liquid confined within the chamber 8. Handles 20 are applied to the ring 18 for convenience in manipulating the same, and the said ring is provided with an air vent 21 which is normally closed by a plug 22, but which can be opened to permit the ingress of air when it is desired to withdraw the liquid within the chamber 8 through the discharge faucet 23.

For the purpose of locking the annular closure 18 firmly in position, a series of wings 24 are hinged at 25 to the side walls of the outer shell A at a point above the shoulder 7, said wings being adapted either to be swung away from the closure 18, or swung outwardly into engagement with the top thereof to hold the closure firmly seated in position. If desired, the lower edges of the locking wings 24 may be provided with resilient arms 24ᵃ arranged to frictionally engage the closure 18 to hold the parts in operative position even though the pail may be subjected to constant jarring and vibration such as would otherwise tend to cause the parts to work loose. The discharge faucet 23 is arranged at the bottom of the outer shell A and extends through the vacuum chamber 5, the valve of the faucet being controlled by a stem 26 which extends upwardly through the vacuum chamber and projects above the shoulder 7, being provided at its extremity with a handle 27. The faucet is thus controlled from the top of the pail, and the arrangement is such that it is not necessary to tilt or tip the pail except to a very slight extent in order to completely drain the liquid contents from the chamber 8. A tubular casing 28 preferably surrounds the valve stem 26 and extends between the faucet 23 and the top of the vacuum chambers, thereby preventing the arrangement from interfering with the maintenance of a vacuum within the space between the double walls of the shell. If desired, a drinking cup 29 may be carried in the space between the cover 9 of the food compartment B and the cover 2 of the outer shell A.

The solid parts of the lunch are designed to be packed within the interior of the food compartment B, and a removable tray 30 is shown as supported therein upon suitable shoulders 31. When the parts are assembled, the food compartment B is held securely in position by the annular closure 18 of the liquid receiving chamber 8, said annular closure being in turn locked in position by the swinging wings 24. All looseness is thus taken up so that the pail can be carried without rattling of the parts, and the liquid is tightly confined within the chamber 8 so that it can not leak into any other parts of the pail, and does not interfere with the proper packing of the solid portions of the lunch. It will also be noted that the liquid is confined between two vacuum chambers, so that it is heat-insulated and will remain either hot or cold for a very considerable length of time. The liquid can be withdrawn through the faucet 23 without the necessity of pouring it through the open end of the pail, and the entire food compartment can be bodily removed when cleaning the pail, thereby enabling all parts of the pail to be easily kept in a thoroughly sanitary condition, and preventing the liquid receiving chamber 8 from becoming sour, as not infrequently happens in constructions where proper access can not be had to the interior of the chamber for the purpose of cleansing the same.

Having thus described the invention, what I claim as new and desire to secure by Letters Patent, is:—

1. A dinner pail including an outer shell open at the top thereof, an inner food compartment fitted removably within the outer shell and spaced therefrom to provide a liquid receiving chamber between the two members, an annular closure for the liquid receiving chamber, said annular closure engaging the outer shell and overlapping the food compartment to retain the latter in position, and locking means upon the outer shell for engaging the annular cover to retain the latter in position.

2. A dinner pail including an outer shell open at the top thereof and having a double walled construction with an upwardly facing interior shoulder toward the top thereof, a double walled food compartment fitted removably within the outer shell and spaced therefrom to provide a liquid receiving space between the two members, said food compartment being provided with an upwardly facing shoulder, means for holding the food compartment and outer shell in a properly spaced relation, an annular closure having a flanged outer edge which engages the outer shell while the inner edge thereof overlaps the before mentioned shoulder of the food compartment and coöperates therewith to hold the food compartment in position, and locking members mounted upon the outer shell for engagement with the annular closure to hold the latter in operative position.

3. A dinner pail including a double walled outer shell open at the top thereof, a double walled food compartment fitted removably within the outer shell and spaced therefrom to provide a liquid receiving chamber between the two members, means for maintaining the food compartment in a properly spaced relation to the outer shell, said food compartment being formed with an upwardly facing shoulder, an annular closure for the liquid receiving chamber, said annular closure being formed with a flanged outer edge which engages the outer shell while the inner edge thereof projects over the shoulder of the food compartment and coöperates therewith to hold the food compartment in position, swinging wings mounted upon the outer shell and arranged to be swung over the annular closure to hold it in position, and resilient flanges upon the swinging wings for frictionally engaging the annular closure.

4. A dinner pail including a double walled outer shell open at the top thereof, said outer shell having positioning depressions in its bottom, a double walled food compartment fitted removably within the outer shell and spaced therefrom to provide a liquid receiving chamber between the two members, said food compartment being formed with an upwardly facing shoulder, spacing arms projecting from the food compartment and arranged to engage the before mentioned positioning depressions in the bottom of the outer shell, an annular closure for the liquid receiving chamber, said annular closure being constructed for coöperation with the shoulder of the food compartment to hold the latter in position, and means for locking the annular closure in operative position.

In testimony whereof I have signed my name to this specification in the presence of two subscribing witnesses.

WILLIAM H. DONCASTER.

Witnesses:
ARTHUR W. DAVIES,
E. S. KELLEY.